United States Patent [19]
Hendrix et al.

[11] Patent Number: 5,788,227
[45] Date of Patent: Aug. 4, 1998

[54] BELTLESS CUT SHEET MEDIA FEEDER AND METHOD FOR FEEDING AND EJECTING SHEETS TO AND FROM A SCANNER APPARATUS

[75] Inventors: Steven W. Hendrix, San Diego; Ronald J. Kaplan, San Marcos, both of Calif.

[73] Assignee: Hewlett-Packard Company, Palo Alto, Calif.

[21] Appl. No.: 651,066

[22] Filed: May 21, 1996

[51] Int. Cl.$^6$ .................................. B65H 5/22
[52] U.S. Cl. .................. 271/3.2; 271/225; 271/184; 271/902; 271/4.1
[58] Field of Search .................. 271/3.2, 4.1, 225, 271/902, 184, 3.18, 3.19, 3.21

[56] References Cited

U.S. PATENT DOCUMENTS

| | | | |
|---|---|---|---|
| 3,337,213 | 8/1967 | Barre | 271/3.18 |
| 4,066,252 | 1/1978 | Wick | 271/3.19 |
| 4,268,022 | 5/1981 | Looney | 271/225 X |
| 4,632,376 | 12/1986 | DuBois | 271/225 X |
| 4,761,001 | 8/1988 | Hayakawa et al. | 271/902 X |
| 5,211,386 | 5/1993 | Baba | 271/3.19 X |
| 5,630,579 | 5/1997 | Minami et al. | 271/4.1 X |

FOREIGN PATENT DOCUMENTS

| | | | |
|---|---|---|---|
| 366120 | 5/1990 | European Pat. Off. | 271/4.1 |
| 172154 | 7/1989 | Japan | 271/225 |
| 89765 | 3/1990 | Japan | 271/4.1 |
| 80167 | 3/1992 | Japan | 271/184 |

OTHER PUBLICATIONS

PLUS Corporation Operation Manual for PLUS Automatic Transparency Feeder DF-20 for Transmissive Type Overhead Projector (2 pages).

*Primary Examiner*—Boris Milef

[57] ABSTRACT

A beltless, automatic document feeder for a flat bed document scanner or other hard copy apparatus using a flat bed scanning station is disclosed. A paper path is formed between a feeder frame guide and a paper loading tray. A document sheet pulled from a stack loaded in the tray is transported along the path by a dual function driver. A pad overlaying the flat bed of the scanner is provided with a cooperative lip such that the leading edge of the pulled document sheet is directed from the paper path to the flat bed and under the pad. A second, bi-directional driver, associated with the pad and the flat bed, transports the document sheet to a fully scannable position between the pad and flat bed without releasing the trailing edge of the document sheet. After scanning, the second driver is reversed to remove the scanned document sheet from the bed and transport it to the dual function driver which then ejects the sheet along a second path. The first path and second path are on the same side of the flat bed.

18 Claims, 6 Drawing Sheets

BELTLESS CUT SHEET MEDIA FEEDER AND METHOD FOR FEEDING AND EJECTING SHEETS TO AND FROM A SCANNER APPARATUS

BACKGROUND OF THE INVENTION

1. Field of the Invention

The present invention relates generally to hard copy document apparatus, more particularly, to cut sheet media automatic document feeders and, more specifically, to a beltless, cut sheet media, automatic document feeder for a flat bed scanner.

2. Description of Related Art

Automated business machines for producing or reproducing hard copy documents, such as copiers, printers, telecommunications facsimile machines, document scanners, and the like, are well known commercially.

Ideally, when working with cut sheet media, a hard copy device often includes an automatic document feeder ("ADF") mechanism for automatically feeding a single sheet to a functional station where the device performs an operation—e.g., scan the fed document sheet for copying, faxing, displaying on a computer monitor, or the like. Following the operation, the ADF then off-loads that sheet and feeds the immediately following sheet of the document to the functional station. A sequential flow of sheets by the ADF and positioning without the necessity of manual handling reduces the time required to accomplish the complete operation. Media which already contains printed matter (hereinafter referred to generically as a "document") presents a need for proper alignment to a scanning station.

Two major problems associated with business machines that include an ADF are the occasional misfeed, commonly known as a "paper jam," and a multiple sheet feed. Paper jams interrupt operation and require manual correction of the problem before the automated conveying can be restarted. Multiple sheet feed can result in a missing page in the copy.

Most commercial ADFs for scanners scroll the document page-by-page passed a stationary scan head and into an output tray. However, this makes pre-scanning and other multiple scanning operations difficult or even impossible, leading to degraded scan output quality.

Belt type document feeders have been adapted to place a document onto a flat, transparent, scanning bed. One such system is shown in U.S. Pat. No. 5,342,133 (Canfield), assigned to the common assignee of the present invention. Such an ADF apparatus is a relatively complex mechanism and therefore relatively expensive to manufacture.

Therefore, there is a need for a simple, inexpensive ADF, adaptable for hard copy apparatus that employ a flat bed document scanners.

SUMMARY OF THE INVENTION

In its basic aspects, the present invention provides cut sheet media document transport apparatus for a hard copy apparatus having flat bed scanning station for sequentially scanning all sheets of a document. The apparatus of the present invention includes: a loading tray for receiving sheets of a document as a stack; a pick mechanism for sequentially picking individual sheets from the stack and transporting a leading edge of an individual sheet picked from the tray; a multifunction drive mechanism for receiving the leading edge of the individual sheet picked from the tray and for feeding the individual sheet to the bed via a first path and for ejecting the individual sheet from the bed via a second path; and a bed drive mechanism for controlling motion of the individual sheet onto the bed and off of the bed via a trailing edge of the individual sheet, delivering the sheet from the bed to the multifunction drive mechanism for transport via the second path.

Moreover, the present invention provides a method for automatically feeding and ejecting sheets of a document to a scanning station of a document scanner having a flat bed scanning station. The method comprises the steps of: capturing a leading edge of a sheet with a sheet feed mechanism; transporting the sheet through a first path to establish contact of the leading edge with the flat bed; forcing the sheet in a first direction between the flat bed and a substantially covering pad superjacent the flat bed until the sheet is in position for scanning while maintaining contact with a trailing edge of the sheet; and following a scanning operation by said document scanner, forcing the sheet via the trailing edge from the position for scanning in a reverse direction from the first direction and ejecting the sheet via a second path.

It is an advantage of the present invention that it feeds cut sheet media onto a flat glass scanning bed with the advantages of belt type sheet feeders, but without the expense.

It is another advantage of the present invention that both sheet feed and sheet removal are accomplished with a single apparatus.

It is a further advantage of the present invention that it provides a media pressure pad to ensure that each sheet is substantially flat against the flat glass scanning bed of the hard copy apparatus.

It is still another advantage of the present invention that the same apparatus and method of operation is adaptable to any length media, e.g., letter, A4, legal, or custom-size paper.

It is yet another advantage of the present invention that it outputs paper to the same side of the ADF as the input, providing a small apparatus footprint.

It is still another advantage of the present invention that it provides same side input and output for the convenience of the user.

It is yet a further advantage of the present invention that documents remain collated.

Other objects, features and advantages of the present invention will become apparent upon consideration of the following explanation and the accompanying drawings, in which like reference designations represent like features throughout the drawings.

BRIEF DESCRIPTION OF THE DRAWINGS

FIG. 1 is a first perspective view (overhead, right rear angle) of an ADF in accordance with the present invention adapted for a flat bed platen scanning station of a hard copy apparatus such as a document scanner, copier, or the like.

The drawings referred to in this specification should be understood as not being drawn to scale except if specifically noted.

DESCRIPTION OF THE PREFERRED EMBODIMENT

Reference is made now in detail to a specific embodiment of the present invention, which illustrates the best mode presently contemplated by the inventor(s) for practicing the invention. Alternative embodiments are also briefly described as applicable. The present invention is discussed in terms of an exemplary embodiment adapted for use with a flat bed document scanner, such as the HP™ ScanJet™ family of commercial products. However, it is not the intention of the inventors to limit the implementation by use of the exemplary embodiment, nor should such intention be implied. It will be recognized by persons skilled in the art that the present invention as claimed herein is adaptable to a variety of ADF implementations.

Figure 1:
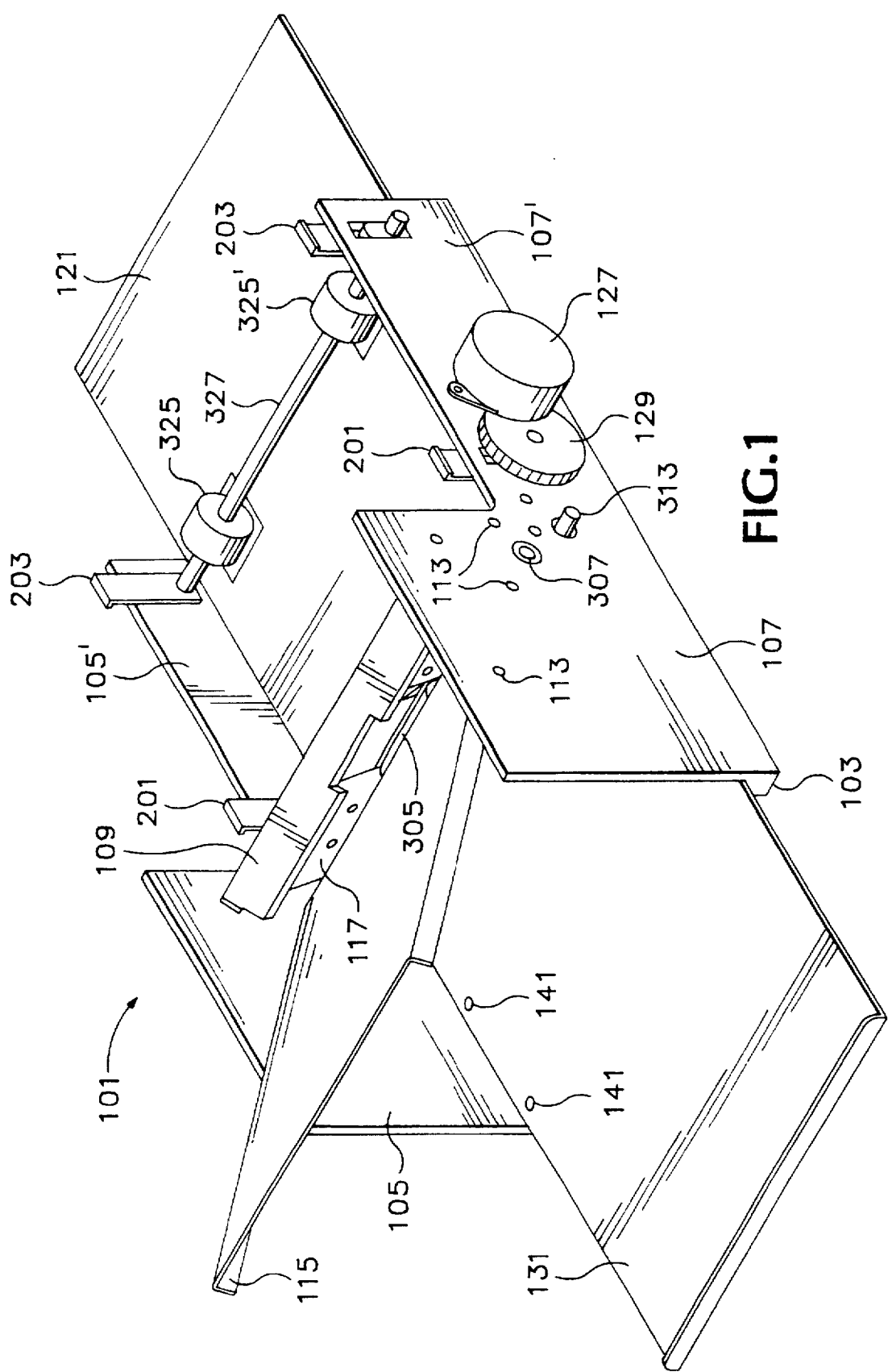
Figure 2:
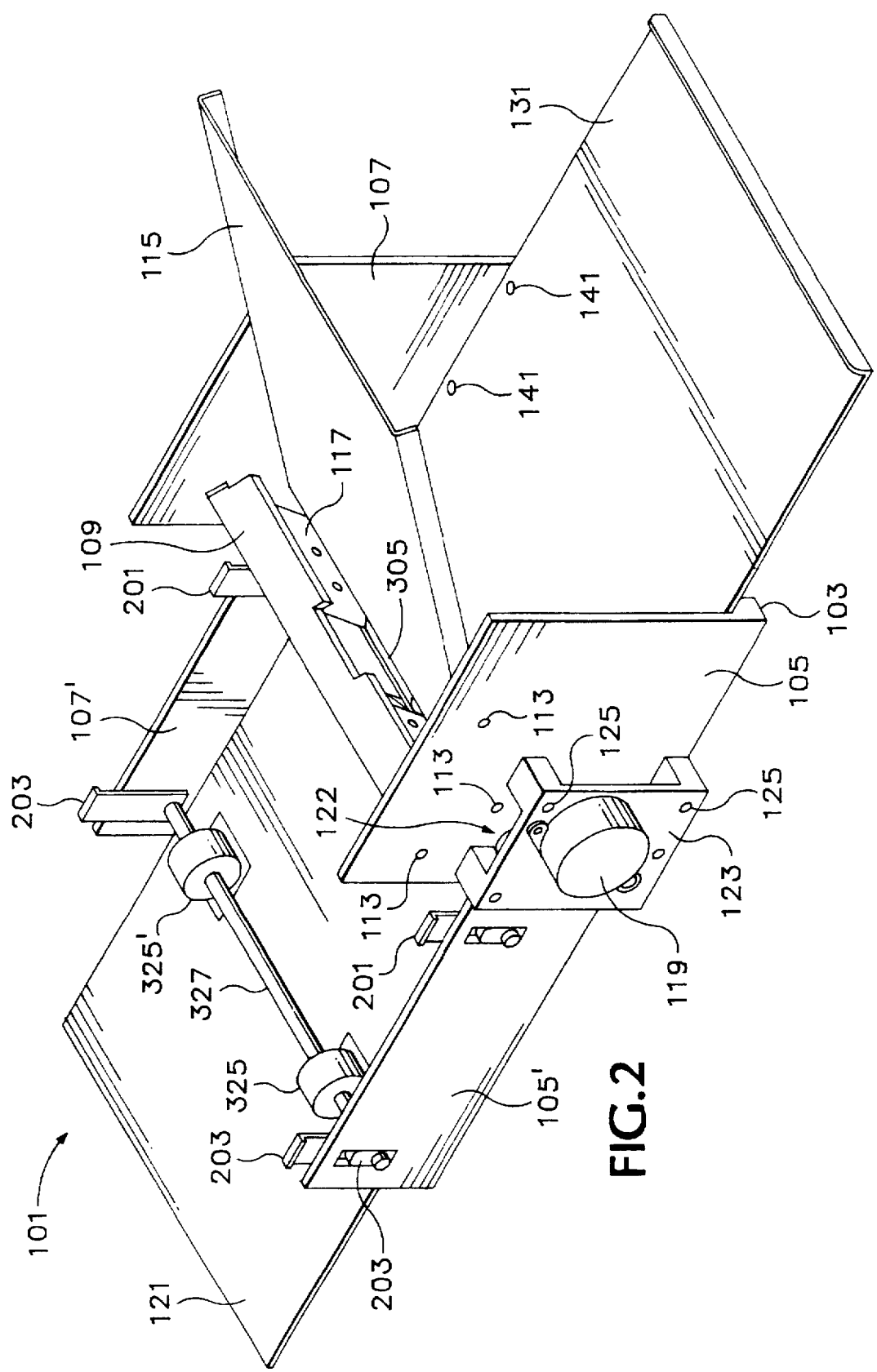
FIG. 2 is a second perspective view (overhead, left rear angle) of the present invention as shown in FIG. 1.
Figure 3:
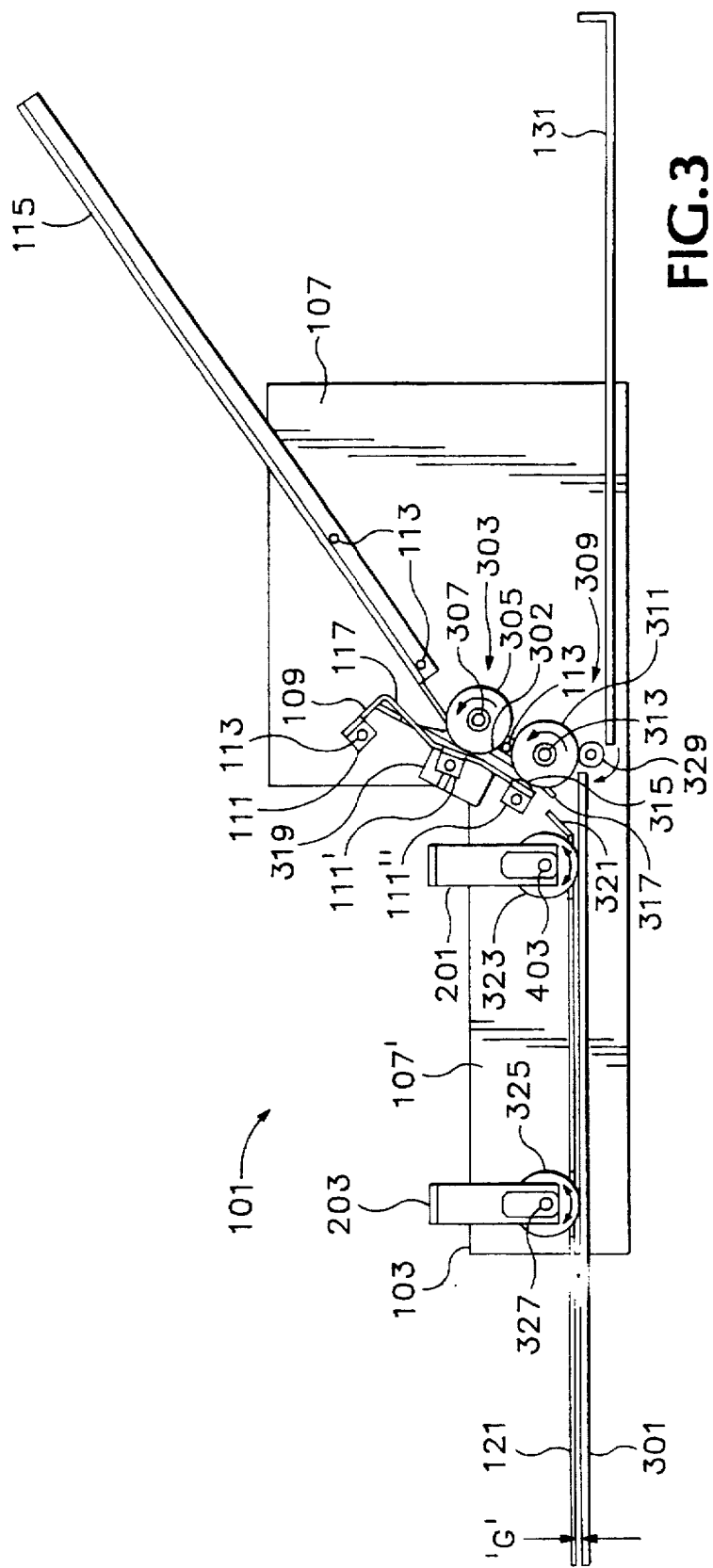
FIG. 3 is an elevation view of the present invention as shown in FIG. 2 with the side plates, motor mount, and motor removed.

FIGS. 1 and 2 generally depict a beltless automatic document feeder ("BADF") 101 in accordance with the present invention as adapted for integration with a flat bed document scanner (not shown). [Referring briefly to FIG. 3, the flat, transparent (usually glass), bed 301 of a scanning station of a document scanner is shown, oriented in operational relationship to the apparatus of the present invention; further understanding of the scanner apparatus is not necessary to an understanding of the present invention.] Note that the present invention is designed to be adaptable as either an integral part of a scanner or an add-on accessory mechanism.

A frame 103 includes left and right side plates 105, 107. A top brace 109 includes brackets 111, 111', 111" as shown in FIG. 3 which are used to fasten the top brace 109 to each of the side plates 105, 107 with suitable fasteners such as rivets 113, or the like, as would be known in the art. [Note that it is recognized that molded plastic technology may be used wherever practical and economical to construct a commercial embodiment of the present invention.] The top brace 109 holds the side plates 105, 107 in a fixed spatial orientation and also serves to cooperate with other elements of the BADF 101 to establish a paper pathway.

A cut sheet document loading tray 115 is similarly coupled between the side plates 105, 107, forming an approximate forty-five degree (45%), oblique, angle to the horizontal. Again, rivets 113, or other suitable fasteners, are employed to hold the loading tray 115 and the side plates 105, 107 in a fixed orientation. A stack of paper (not shown), deposited print side down in the loading tray 115, will slide under the force of gravity until respective leading edges of each sheet come into contact with the top brace 109. Thus any oblique angle which accomplishes this function is acceptable. Note that the top brace 109 can be suitably angled at a paper contact region of the top brace underside 117 to fan the stack such that the lowest sheet in the stack is deeper into the apparatus along the paper pathway than the top sheet in the stack. This fanning assists in preventing multiple sheet picking during a feed cycle of operation. Note also that the loading tray 115 has a descending portion 302 (FIGS. 3 and 6) that is bent to parallel the under side 117 of the top brace 109, forming a paper pathway section therebetween.

Figure 6:
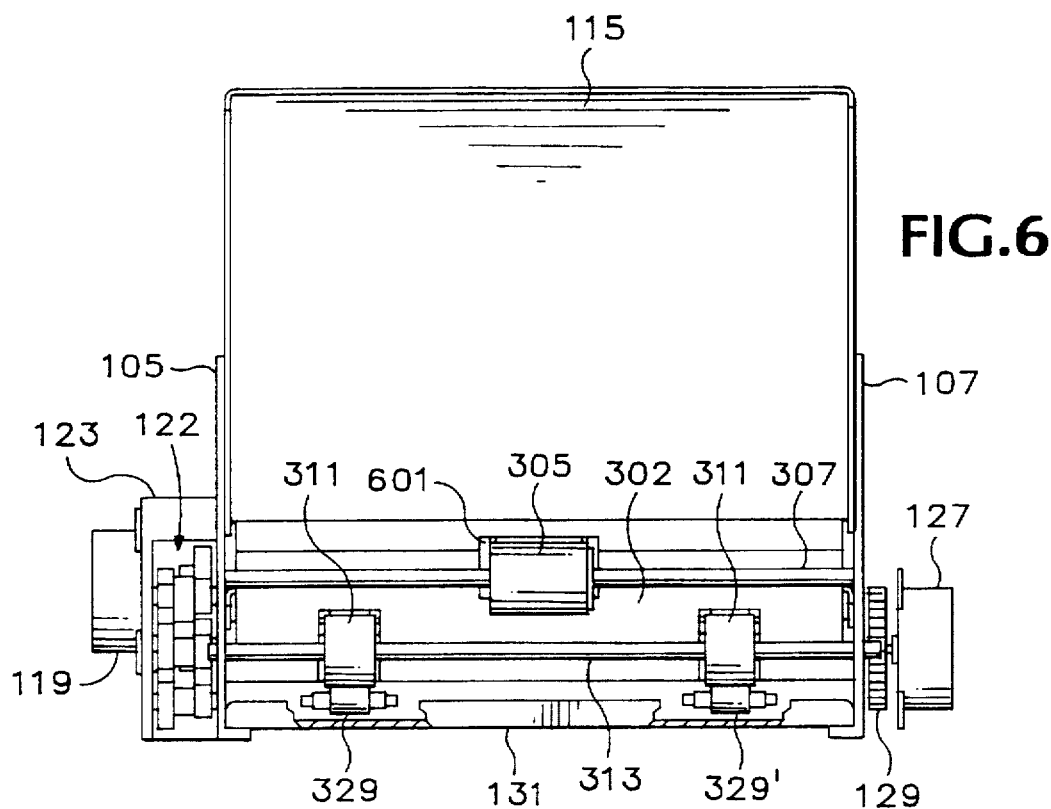
FIG. 6 is an elevation view facing inward from the output tray end of the present invention as shown in FIG. 1.
Figure 7:
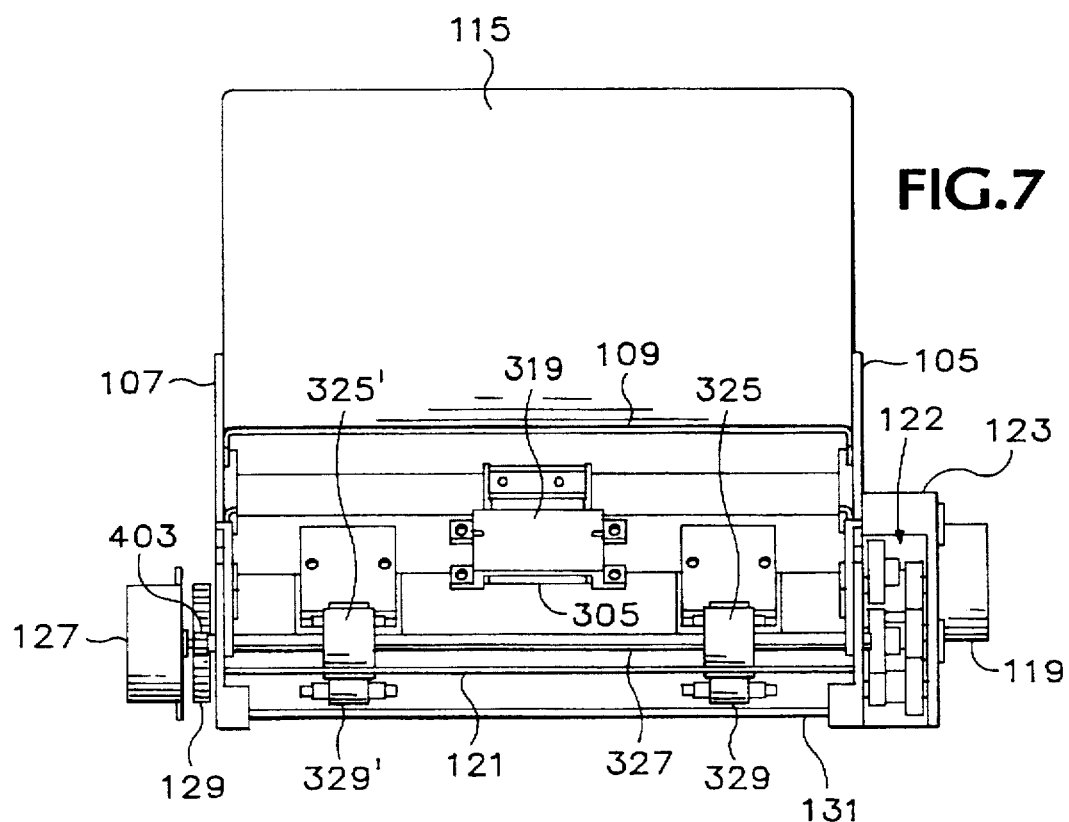
FIG. 7 is an elevation view facing inward from the pressure pad end as shown in FIG. 1.

As best seen in FIGS. 3 and 6, a sheet picking mechanism 303 is set within a cutout section 601 (FIG. 6 only) in the descending portion 302 of the loading tray 115 where there is an interface of the loading tray 115, the sheet picking mechanism 303, and the underside 117 of the top brace 109. Sheet picking mechanisms are well known in the art. For example, U.S. Pat. No. 5,449,161 (Gysling—assigned to the common assignee of the present invention and incorporated herein by reference) teaches a Hard Copy Sheet Media Pick Mechanism typifying paper pick devices. A sheet separator wheel 305 is mounted on an axle 307 for rotation (in the direction of the arrow as shown in FIG. 3). Generally, the separator wheel 305 is located in a central position between the side plates 105, 107. A motor 119 and a first transmission 122 (FIGS. 2 and 6) are affixed to a side plate 105 by a motor mount 123 and are coupled to the axle 307 for driving the separator wheel 305. The motor 119 and first transmission 121 are commercial parts assembled in any standard manner as would be well known in the art. Frictional forces, aided by the fanning of the document, causes sheet separation during a pick cycle, minimizing multiple sheet misfeeds. The motor mount 123 is affixed to either side plate as suits a particular implementation, such as by screws 125, or the like. The axle 307 extends through a bearing aperture in the opposite side plate 107 as shown in FIG. 1.

A multifunction, media drive mechanism 309 (FIG. 3) is positioned below the sheet picking mechanism 303. At least one media drive wheel 311, and preferably a pair of wheels 311 as seen in FIG. 6, is provided to maintain proper sheet registration with respect to the paper path and the scanner bed 301. The media drive wheels 311 are mounted on a drive shaft 313 extending from a bearing in one side plate 107 (FIG. 1) to the transmission 122 and motor 119 mounted on the opposite side plate 105. A pair of drive wheel idlers 315 (FIGS. 3 and 4) are mounted for rim-to-rim contact with the drive wheels 311 in the paper pathway between the paper tray descending portion 302 and the underside 117 of the top brace 109 just above the lower terminal end 317 of the descending portion 302 of the tray 115.

Note that a continuous paper path has been formed, starting from the input tray 115 where the lowest sheet in the fanned stack is pinched between the top brace underside 117 and the separator wheel 305, continuing below the separator wheel 305 between the underside 117 and the tray descending portion 302, then between the rim-to-rim interface of the drive wheels 311 and idlers 315, and onto the lower terminal end 317 of the paper tray descending portion 302. A plastic member 319 also provides support as part of the sheet separation mechanism.

Figure 5:
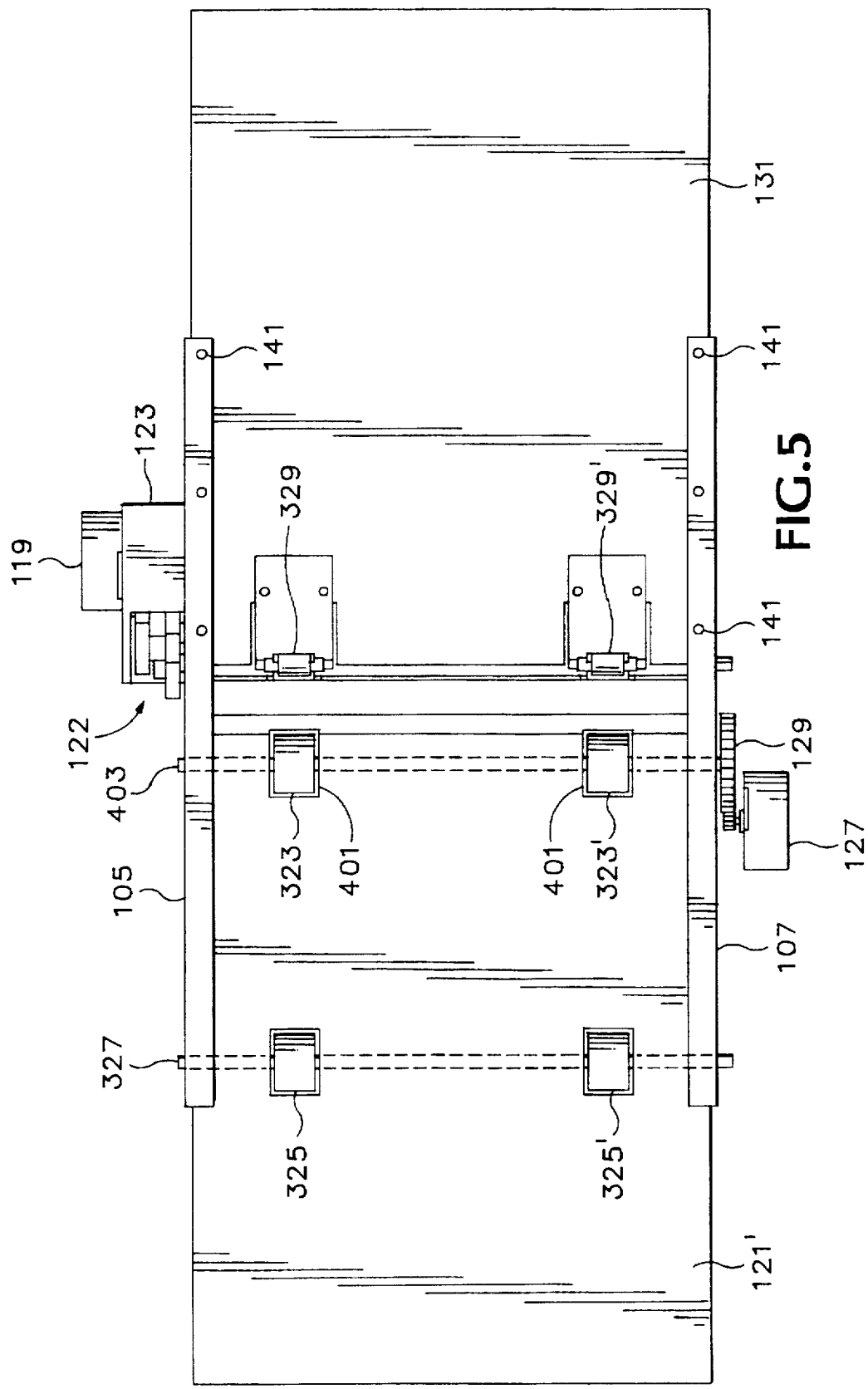
FIG. 5 is a plan view (bottom) of the present invention as shown in FIG. 4.

As best seen in FIGS. 1, 2, and 3, each side plate 105, 107 is provided with an extension arm 105', 107', respectively. The extension arms 105', 107' are horizontally spaced such that the glass bed 301 of the scanner is received therebetween as shown in FIG. 3. The apparatus of the BADF 101 in accordance with the present invention further includes a pressure pad 121 mounted to the extension arms 105', 107' to form an overlay to the glass bed 301 with a gap, "G" (FIG. 3 only), between the upper surface of the glass bed 301 and the lower surface 121' (FIG. 5) of the pressure pad 121. Pushing a document sheet between the glass bed 301 and the pressure pad 121 can actually be accomplished in at least two ways: the pad can be lifted slightly to provide a channel with gap 'G' as shown; or, the pressure pad material and force exerted on the glass bed 301 by the pad 121 can be such as to provide a low coefficient of friction, allowing a sheet to slide between the two but being high enough to prevent the sheet from buckling. The inventors have found that both methods work equally as well. A pad 121, having a surface 121' (FIG. 5) coated with, or manufactured of, a polyester open-cell foam with poycarbonate film, when laid upon the flat glass of the bed 301 keeps the friction factor low enough such that proper positioning of a sheet can be accomplished without the gap 'G'.

As can be been in FIG. 3, the inner reach of the pressure pad 121 has a raised lip 321 proximate the lower terminal end 317 of the paper tray descending portion 302. The proximate relationship is designed such that the leading edge of a sheet of paper coming down the paper path as previously described passes between the pressure pad raised lip 321 and the paper tray descending portion end 317. The leading edge then passes under the pressure pad 121 along the top surface of the scanner glass bed 301.

Figure 4:
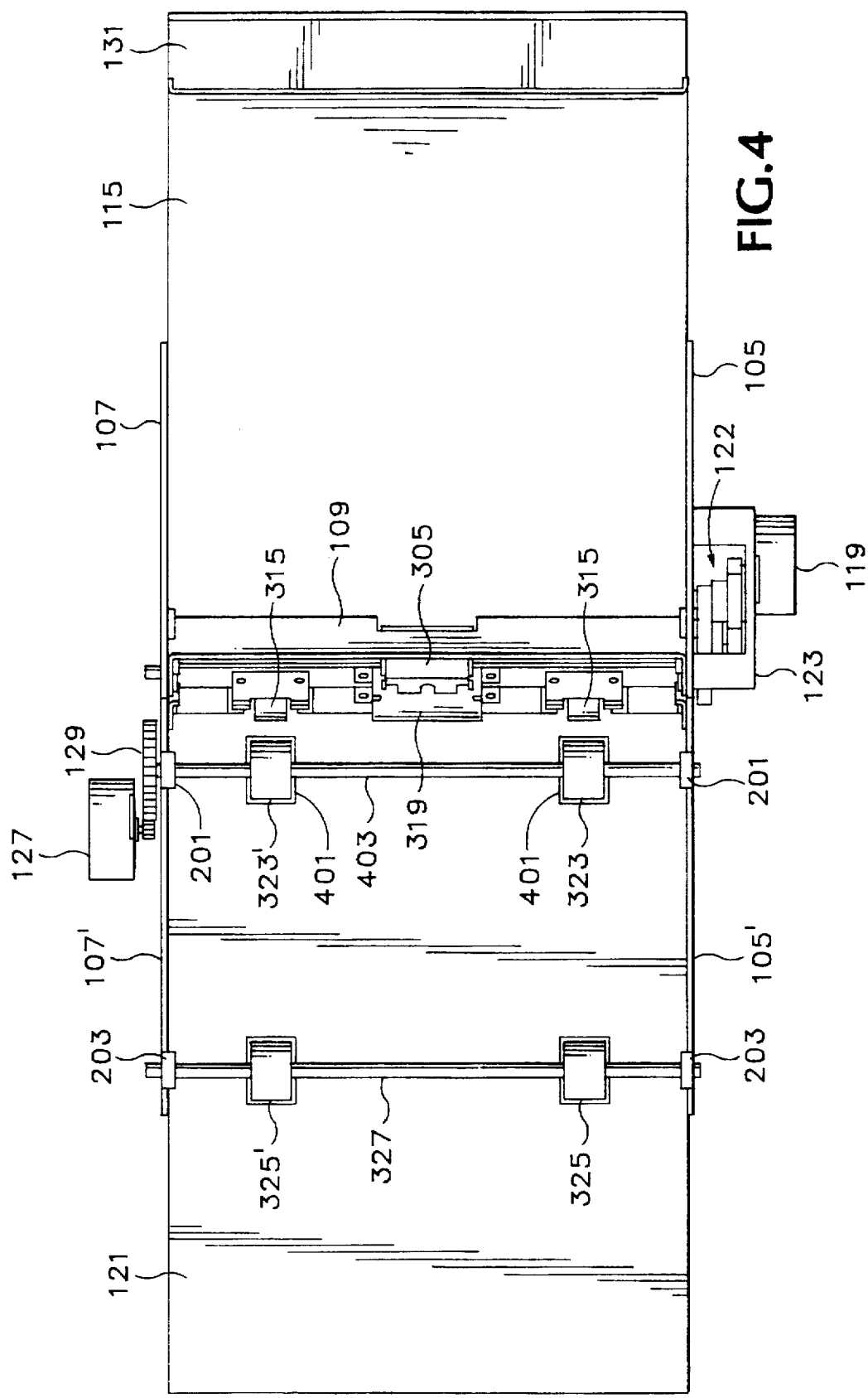
FIG. 4 is a plan view (top) of the present invention as shown in FIG. 3.

At least one scanner bed paper drive wheel, and preferably two scanner bed drive wheels 323, 323' are provided. The pressure pad 121 is provided with a set of apertures 401 (FIG. 4) through which the scanner bed paper drive wheels 323, 323' descend so as to ride against the top surface of the scanner bed 301 as seen in FIG. 3. The scanner bed paper drive wheels 323, 323' are mounted on a common drive shaft 403. The drive shaft 403 has a mount 201 (FIGS. 1, 2, 3, and 4) coupling the drive shaft 403 to each of the extension arms 105', 107' of the side plates 105, 107. The drive shaft 403 is mounted to slide freely in the vertical direction so that the weight of the wheels 323, 323' and drive shaft 403 provides a pinch force downwardly onto a media sheet. As best seen in FIGS. 1 and 4, on one of the extension arms 107', a reversing (see arrow on drive wheel 323 in FIG. 3) drive motor 127 is mounted and coupled to the drive shaft 403 via a second transmission 129 in any suitable manner as would be known in the art.

To review the paper path and document sheet feed operation, starting from the tray 115 where the lowest sheet in the stack is pinched between the top brace underside 117 and separator wheel 305, the picked sheet moves face down below the separator wheel 305 between the underside 117 and the tray descending portion 302; then the sheet passes between the rim-to-rim interface of the drive wheels 311 and idlers 315 and across the lower terminal end 317 of the paper tray descending portion 302; the separator wheel 305 continues driving the sheet such that the leading edge passes between the lip 321 of the pressure pad 121 and the terminal end 317 until the leading edge of the sheet contacts and slides along the top surface of the scanner bed 301 until it is received by the scanner bed paper drive wheels 323, 323'. At this point, the separator wheel 305 can be disengaged from its motor 119 and free-wheel as the scanner bed paper drive wheels 323, 323' push the sheet between the pressure pad 121 and the bed 301.

To ensure proper sheet alignment on the bed 301, if desired, an optional set of passive guide wheels 325, 325' (FIGS. 1–5 and 7) can be provided to ensure proper alignment and position of the document sheet against the top surface of the scanner bed 301. As with the scanner bed paper drive wheels 323, 323', a common axle 327 extends between the extension arms 105', 107' via suspensions 203 located distally from the paper loading tray 115 and its associated mechanisms. The guide wheels 325, 325' are free to rotate in both axial directions (as depicted by the arrow on wheel 325, FIG. 3). A document sheet driven by the scanner bed paper drive wheels 323, 323' will slip beneath the radial surface of the guide wheels 325, 325' and thereafter be guided into a proper position, namely to the position where the entire document sheet can be scanned.

It is important to note that the trailing edge of a document sheet now positioned for scanning through the glass bed 301 of the scanner apparatus is still in contact with the scanner bed paper drive wheels 323, 323', yet the entire document sheet is positioned to be scanned.

Following a scanning operation, the document sheet needs to be removed from the scanner glass bed 301. As best seen in FIG. 3, the trailing edge of the document sheet so positioned on the bed 301 has its trailing edge in contact with the scanner bed paper drive wheels 323, 323'. When the motor 127 is reversed, the sheet is pulled from between the pressure pad 121 and the surface of the glass bed 301 by these drive wheels 323, 323'. The trailing edge of the "fed document sheet" has now become the leading edge of the "ejecting document sheet." The ejecting sheet slides along the top surface of the glass bed 301 until this new leading edge contacts a nip between the driver wheels 311 and a set of eject idler wheels 329, 329', suitably mounted (FIG. 5) beneath the paper drive wheels 311, 311', respectively, to be driven thereby (as depicted by the arrow beneath idler wheel 329 in FIG. 3). Note that the paper drive wheels 311, 311' do not have to reverse direction. A document sheet taken into the nip is driven until its trailing edge passes through the nip, ejecting the document sheet.

In the preferred embodiment, an output tray 131 (FIGS. 1–6) for receiving ejected document sheets is provided. The output tray 131 is suitably mounted (such as by rivets 141 (FIGS. 1, 2, and 5)) to the frame between the side plates 105, 107 and below the level of the nip between the driver wheels 311 and the eject idler wheels 329, 329'. The output tray 131 catches the ejected sheets face down. Note that from loading to ejecting, the document remains collated.

Controls for timing the feed and ejection of document sheets can be coordinated with the scanning apparatus controller and optimized in accordance with the specific hard copy apparatus, e.g., scanner, printer, or the like, with which the BADF 101 of the present invention is employed. Such control techniques are known to persons skilled in the art.

The foregoing description of the preferred embodiment of the present invention has been presented for purposes of illustration and description. It is not intended to be exhaustive or to limit the invention to the precise form disclosed. Obviously, many modifications and variations will be apparent to practitioners skilled in this art. For example, the exemplary embodiment uses two motors and transmissions and a simplified mechanism using one motor and transmission can also be designed. Similarly, any process steps described might be interchangeable with other steps in order to achieve the same result. The embodiment was chosen and described in order to best explain the principles of the invention and its best mode practical application to thereby enable others skilled in the art to understand the invention for various embodiments and with various modifications as are suited to the particular use contemplated. It is intended that the scope of the invention be defined by the claims appended hereto and their equivalents.

What is claimed is:

1. A cut sheet media document transport apparatus for a hard copy apparatus having a flat bed scanning station for sequentially scanning individual sheets of a document, the apparatus comprising:

loading means for receiving sheets of a document as a stack;

pick means for sequentially picking individual sheets from the stack and transporting each of said sheets sequentially by a leading edge of each individual sheet picked from the loading means;

multifunction drive means for receiving the leading edge of the individual sheet picked from the loading means and for feeding the individual sheet to the bed via a first path, wherein the first path subjects the sheets of a document to only oblique bending, and for ejecting the individual sheet from the bed via a second path which is a substantially linear path subjacent the first path and has a reverse direction of the first path;

bed drive means for controlling motion of the individual sheet onto the bed and off of the bed by capturing a leading edge of the individual sheet and retaining contact with a trailing edge of the individual sheet while said sheet is on the bed, and for delivering the sheet from the bed to the multifunction drive means for transport via the second path to an output tray adapted for sequentially receiving individual sheets therein; and a fixed sheet media pressure pad superjacent the bed in cooperative relationship thereto such that the first path and the second path includes a gap between the pad and the bed having a gap width approximately equal to sheet media thickness.

2. The apparatus as set forth in claim 1, wherein the multifunction drive means further comprises:

at least one sheet drive wheel;

driver means for at least turning the sheet drive wheel in a first rotational direction;

at least one sheet feed idler wheel abutting the drive wheel in the first path; and at least one eject idler wheel abutting the drive wheel in the second path.

3. The apparatus as set forth in claim 2, wherein the bed drive means further comprises:

at least one bed wheel, connected to the driver means, such that the bed wheel turns in a first direction when a sheet is fed into the station by the driver means and the bed wheel turns in a second direction to remove a sheet from the station such that the trailing edge is re-engaged with the sheet drive wheel and the eject idler wheel.

4. The apparatus as set forth in claim 1, further comprising:

means for fanning a stack of cut sheets such that the lowest sheet in the stack extends furthest into the pick means.

5. The apparatus as set forth in claim 1, further comprising:

the first path has a radial bend of less than approximately sixty degrees.

6. A method for automatically feeding and ejecting sheet media in the nature of a printed document to a scanning station of a document scanner having a flat bed scanning station, the method comprising the steps of:

capturing a leading edge of a sheet with a sheet feed mechanism;

transporting the sheet through a first path wherein while in said path the sheet is bent at an angle of less than 90-degrees to establish contact of the leading edge with the flat bed;

forcing the sheet in a first direction along the first path between the flat bed and a fixed covering pad superjacent the flat bed into a gap, having a width approximately equal to sheet media thickness, between the flat bed and the pad until the sheet is in position for scanning while maintaining contact with a trailing edge of the sheet; and following a scanning operation by the document scanner, forcing the sheet from the position for scanning along a second, substantially linear path in a substantially reverse direction from said first direction subjacent the first path and ejecting the sheet from the bed via the second, substantially linear path.

7. The method as set forth in claim 6, further comprising the step of:

prior to the step of capturing a leading edge of a sheet, fanning a stack of document sheets such that each sheet can be sequentially captured.

8. The method as set forth in claim 6, further comprising the step of:

repeating the steps as set forth in claim 6 for each sheet of the stack.

9. The method as set forth in claim 8, further comprising the step of:

feeding and ejecting the sheets of the stack in an order such that the stack remains collated.

10. An automatic document feeder apparatus for a scanner having a substantially flat scanning station means for scanning sheet media documents, the apparatus comprising:

a frame;

mounted on the frame, a loading tray for receiving at least one sheet of a document, the loading tray mounted at an obtuse angle to a local horizontal reference plane;

mounted on the frame, a guide, having a surface parallel to a region of the loading tray to form a first pathway there between in the obtuse angle;

mounted on the frame, picking means for grasping and transporting a sheet into the first pathway;

mounted in the first pathway, driving means for receiving the sheet and transporting a leading edge of the sheet onto the flat scanning station means at the obtuse angle such that the sheet remains substantially flat through said first pathway and onto the flat scanning station means, and wherein the driving means includes a reversible means maintaining contact with a trailing edge of the sheet; and cooperatively mounted with respect to the flat scanning station means, fixed guiding means for receiving the sheet via the leading edge, for maintaining the sheet in a substantially flat orientation against the flat scanning station means via a gap between the guiding means and the flat scanning station means being less than or equal to sheet media thickness, and for cooperating with the driving means for ejecting the sheet using contact with the trailing edge from the flat scanning station means along a second pathway having an output tray subjacent the first pathway and located on the same side of the flat scanning station means as the first pathway such that the sheet remains substantially flat through the second pathway.

11. The apparatus as set forth in claim 10, wherein the guiding means further comprises:

sheet pressure means having a substantially flat surface parallel to the flat scanning station means, and at least one reversible driver means for gripping the sheet and transporting the sheet in a first direction to a position where scanning of the entire sheet is facilitated without losing contact with the sheet and for ejecting the sheet from the position in a second direction substantially opposite the first direction.

12. The apparatus as set forth in claim 11, wherein the pressure means further comprises:

a pressure pad having a surface of a low friction material abutting the flat scanning station means.

13. The apparatus as set forth in claim 12, wherein the pressure pad further comprises:

the surface having an area substantially coextensive with the flat scanning station means.

14. The apparatus as set forth in claim 12, further comprising:

the pressure pad has a surface with an area substantially coextensive with the flat scanning station means and is mounted on the frame such that after the apparatus is mounted on the scanner, a gap having a width approximately equal to the sheet is between the surface and the flat scanning station means.

15. The apparatus as set forth in claim 10, wherein the driving means comprises:

a motor;

at least one drive wheel coupled to the motor;

a pinch wheel, mounted within the first pathway in rim-to-rim contact with the drive wheel; and an idler wheel, mounted within the second pathway in rim-to-rim contact with the drive wheel such that the drive wheel and the pinch wheel transport the sheet from the reversible means as the sheet is ejected from the flat scanning means.

16. The apparatus as set forth in claim 10, wherein the reversible means comprises:

a motor, and at least one scanning bed wheel coupled to the motor for receiving the sheet via a leading edge from the driving means and transporting the sheet onto the flat scanning station means to a position where the sheet is to be scanned without losing contact with at least a trailing edge of the sheet.

17. The apparatus as set forth in claim 16, further comprising:

the scanning bed wheel being coupled to the motor with a reversing transmission.

18. The apparatus as set forth in claim 10, further comprising:

the loading tray is adapted to receive a stack of sheets in a face down orientation and to fan the stack such that each sheet has a leading edge sequentially in contact with the picking means after a prior sheet exits the stack.

* * * * *